United States Patent
Aparisi Ventura et al.

(10) Patent No.: US 9,765,228 B2
(45) Date of Patent: Sep. 19, 2017

(54) DIGITAL GLAZE INK

(71) Applicant: ESMALGLASS, SAU, Villarreal (castellón De La Plana) (ES)

(72) Inventors: Juan Francisco Aparisi Ventura, Villarreal (ES); Natalia Martínez Borras, Villarreal (ES); Antonio Blasco Fuentes, Villarreal (ES); Vicente Bagán Vargas, Villarreal (ES); Jesús Fernández Valenzuela, Villarreal (ES)

(73) Assignee: Sau Esmalglass, Villarreal (ES)

( * ) Notice: Subject to any disclaimer, the term of this patent is extended or adjusted under 35 U.S.C. 154(b) by 385 days.

(21) Appl. No.: 14/378,934

(22) PCT Filed: Apr. 8, 2013

(86) PCT No.: PCT/ES2013/070224
§ 371 (c)(1),
(2) Date: Aug. 14, 2014

(87) PCT Pub. No.: WO2013/160506
PCT Pub. Date: Oct. 31, 2013

(65) Prior Publication Data
US 2015/0037501 A1  Feb. 5, 2015

(30) Foreign Application Priority Data
Apr. 24, 2012 (ES) .................... 201230602

(51) Int. Cl.
| | | |
|---|---|---|
| C09D 11/14 | (2006.01) | |
| C09D 11/02 | (2014.01) | |
| C09D 11/322 | (2014.01) | |
| C08K 3/22 | (2006.01) | |
| C08K 3/26 | (2006.01) | |
| C08K 3/34 | (2006.01) | |
| B41M 5/00 | (2006.01) | |
| C08K 3/00 | (2006.01) | |

(52) U.S. Cl.
CPC ........... *C09D 11/14* (2013.01); *B41M 5/0047* (2013.01); *C08K 3/26* (2013.01); *C09D 11/322* (2013.01); *B41M 5/007* (2013.01); *B41M 5/0058* (2013.01); *C08K 3/0033* (2013.01); *C08K 3/22* (2013.01); *C08K 3/34* (2013.01); *C08K 2003/2227* (2013.01); *C08K 2003/2231* (2013.01); *C08K 2003/267* (2013.01)

(58) Field of Classification Search
CPC ....... C09D 11/02; C09D 11/14; C09D 11/322; C08K 2003/2227; C08K 2003/2231; C08K 2203/267; C08K 3/0033; C08K 3/22; C08K 3/26; C08K 3/34; B41M 5/0047; B41M 5/0058; B41M 5/007
USPC .............................. 106/31.05, 31.9; 427/256
See application file for complete search history.

(56) References Cited

U.S. PATENT DOCUMENTS

| | | | | |
|---|---|---|---|---|
| 7,803,221 | B2 * | 9/2010 | Magdassi ............... | C09D 11/30 106/31.9 |
| 2003/0011648 | A1 * | 1/2003 | Kabalnov .............. | C09D 11/30 347/1 |
| 2006/0093797 | A1 * | 5/2006 | Sawatsky .............. | B41F 17/006 428/195.1 |
| 2008/0053333 | A1 * | 3/2008 | Johnson ................. | C09D 11/36 106/31.05 |
| 2008/0090034 | A1 * | 4/2008 | Harrison .............. | C09D 11/322 428/32.71 |
| 2008/0210122 | A1 | 9/2008 | Magdassi et al. | |
| 2009/0214840 | A1 * | 8/2009 | Eron .................... | C09D 11/322 106/31.05 |
| 2010/0098952 | A1 * | 4/2010 | Yeong ................. | B41M 5/0047 428/426 |
| 2010/0291362 | A1 * | 11/2010 | Vignali ................. | C09D 11/40 428/210 |
| 2011/0088581 | A1 * | 4/2011 | Crespi ...................... | C03C 8/16 106/31.9 |
| 2015/0291841 | A1 * | 10/2015 | Fernandes ............ | B41M 5/0047 524/606 |
| 2015/0353415 | A1 * | 12/2015 | Villegas .............. | C04B 41/5022 501/20 |

FOREIGN PATENT DOCUMENTS

| | | |
|---|---|---|
| ES | 2368108 T3 | 11/2011 |
| ES | 2384269 T3 | 7/2012 |

OTHER PUBLICATIONS

English translation of the Written Opinion of the International Search Authority mailed Jul. 10, 2013 for PCT/ES2013/070224; 5 pages.*
International Search Report, Spanish Patent Application No. PCT/ES2013/070224 dated Jul. 10, 2013.

* cited by examiner

*Primary Examiner* — Helene Klemanski
(74) *Attorney, Agent, or Firm* — Arent Fox LLP

(57) ABSTRACT

The present invention relates to a digital GLAZE ink, to the method for the preparation thereof and to the use of the digital GLAZE ink for functional and/or decorative coating of a ceramic and/or metallic material.

16 Claims, No Drawings

DIGITAL GLAZE INK

CROSS-REFERENCE TO RELATED APPLICATIONS

This application is a National Stage entry of International Application No. PCT/ES2013/070224, filed Apr. 08, 2013, which claims priority to Spanish Patent Application No. P201230602, filed Apr. 24, 2012. The disclosures of the prior applications are hereby incorporated in their entirety by reference.

FIELD OF THE INVENTION

The present invention in general falls within the field of GLAZES and specifically relates to a high-discharge digital GLAZE ink.

STATE OF THE ART

In ceramics, the GLAZES give to the final product, among many things, a waterproof coating without porosity, aesthetic finishes (gloss, matt, satin . . . ), coloring (background), an opaque homogeneous interface onto the clay support for decoration by screen printing, the decoration itself (design by screen printing) and effect (lustre, metallized, . . . ), and also abrasion resistance of the surface decoration.

The most common form of industrially applying ceramic GLAZES is carried out at room temperature by curtain with bell or analogue contacting techniques such as flat or rotary screen printing, gravure and flexography.

Generally, the manufacturer itself of ceramic coating prepares GLAZES by simple mixing from powder dry GLAZES, powder ceramic pigments, serigraphic vehicles and water. In these cases, inks whose rheological behavior is clearly pseudoplastic, more or less pronounced depending on the application process but needed to control sedimentation of solid particles are used, also characterized by average viscosity values higher than 600 cP at high shearing gradients and surface tension values greater than 35 mN/m.

In general, in ceramics it is common to apply a coat of GLAZE with solid particles of an average size of several microns and a maximum size ($d_{100}$) of at least 45 microns, with a covering of about 1 kg/m² of GLAZE In recent years, the inkjet technology has proven to be a viable alternative to apply many different materials without contact on a wide range of supports. Since 2005, the inkjetDropOnDemand (DOD) technology allows applying colored pigmented inks for industrial decoration of ceramic coating. Since then, and especially in the last 3 years, the ceramic inkjet is replacing the conventional screen printings with flat and rotary screens with silicone rollers.

Ceramic colored pigmented inks do not contain GLAZE, in addition are of the "ready to use" type in non-polar base or low polarity, and must meet very strict specifications within ranges as close as possible.

The viscosity values at the working temperature of the inkjet print heads, between 35 and 55° C., do not usually exceed 20 cP at shearing gradients greater than 1000/s, in addition the surface tension values are also low with values around 30 mN/m. Due to the small and limited diameter of the nozzles of DOD inkjet print heads, the majority lower than 50 μm, the particle size of the solid portion must not exceed 0.5 μm.

The most common ways of integrating ceramic pigmented colored inks in the process of industrial decoration of pressed clay supports, before heat treatment between 500 and 1300° C., are either on an GLAZE base, or on the engobe of the base or directly on the mass-colored base and then applying a thin layer of GLAZE as a wear protection. The engobes, GLAZES and protections are still being applied with conventional methods (mainly bell and discs) since there is no yet industrially viable alternative techniques and more cost-effective.

However, the ceramics is not only color or graphics, is also a set of materials, contrasts, touches, glosses, textures, that brings this differentiation with regard to other coatings. At Esmalglass-itaca grupo, *Esmaltes Digitales para un proceso de esmaltación y decoración totalmente digital*, Bol. Soc. Esp. Ceram. Vid. Vol 50.2, March-April 2011, pp. XXIII-XXVI, ready to use oil-based GLAZES that can be applied with DOD inkjet print heads used in ceramics (Seiko, Xaar, Dimatix, for example) are described, and which allow decorating and GLAZING simultaneously and even synchronously and thus be able to give material effects to ceramic decoration with all the advantages of digital systems.

However, the amount applied is usually around 10 g/m² per DOD head and the solid content is limited by the rheological requirements. All this together with the small particle size, at the nanometer scale, only allows obtaining a thin layer of material the ceramic performance of which requires new and exclusive developments of GLAZES. The application of GLAZES with these characteristics is suitable for achieving aesthetic decorative effects, comparable but still limited with respect to conventional GLAZES, but in any case the overlapping of thin layers until obtaining a thick layer is viable for an industrial process.

At this point, a gap between conventional techniques and inkjet to produce industrially a tile entirely with digital technology, extending to the rest of ceramic materials the same numerous advantages provided for color and graphics scanning has yet to be filled. Said gap corresponds specifically to be able to implement digitally, with all the flexibility and versatility advantages of inkjet technology, high GLAZE discharges exceeding 100 g/m² in a single pass with the current industrial productivity and with a cost low enough so that the finished tile is competitive in the ceramics market. Application of high weights of GLAZES must allow obtaining not only decorative aesthetic effects (gloss over matt and vice versa, satin, lustre, metallized, etc. . . . ) and thick layers for thickened effects identical to those obtained with screen printing with flat screens or silicone rollers, but also an infinite number of RELIEFS which currently can only be achieved with press moulds.

All of this, which cannot be attained with DOD inkjet technology due to its technical or economic limitations, would take advantage of the enormous advantages that the digital technology brings to the ceramics sector to be able to apply material and thus complete a fully digital GLAZING line with which a great innovation of industrial process would be achieved.

Finally, due to the important weights to be applied, at least ten times higher than those of the colored inks, the digital GLAZES and the corresponding manufacturing process thereof must be very competitive for industrial use. Moreover, because of these high weights, the decomposition of the solvent (or mixture of these) at ceramic cooking temperatures (between 500-1300° C.) must be good, so that there are no "punctured" defects, "black heart", etc., produced by a bad degassing (as happens with the current olefin systems of DOD inks).

Other alternative digital technologies, with wide scope of application, allowing depositing materials in sufficient quantity, on the scale of kg/m², to obtain coatings comparable to those obtained with conventional technologies, but with all the productive advantages provided by digital technology but without the high definition of the inkjet (high resolution with small dot size) have recently been developed. Such technologies are described in patent applications: WO99/46126, WO2006/027212 and EP2085225, for example, in which it is understood that could be applied the same inks as with conventional systems or simply diluted them in a medium.

However, particularly in the case of ceramics, there is no optimal results using traditional GLAZES, only with high discharge digital GLAZE inks the properties of which are different are attained good applications, and therefore are the subject of the present patent application. The main properties such as rheology, viscosity and particle size as well as the use of an aqueous polar medium constitute the present innovation.

There is therefore a need for a GLAZE ink that solves the abovementioned problems:
  Suitable granulometry, rheology, and viscosity.
  High discharge with competitive costs and without any degasification problems.

DESCRIPTION OF THE INVENTION

Thus, in a first aspect, the present invention relates to a digital GLAZE ink (hereinafter GLAZE ink of the present invention) comprising a solid portion made up of organic and/or inorganic materials, dispersed in a polar and/or aqueous liquid portion characterized in that:
  1) the solid portion is between 10-70% of the total weight of the ink, the solid particle size is less than 40 µm and comprises:
     at least a flux material, a ceramic raw material or frit
     at least an anti-settling
  2) the liquid portion comprises:
     water in a percentage of at least 5% of the total weight of the ink,
     at least 5% of the total weight of one or more non-aqueous polar solvents
     additives In a most particular aspect of the invention, the flux material, ceramic raw material or frit of the GLAZE ink of the present invention is at least one element selected from frits, sands, feldspars, aluminas, clays, zirconium silicate, zinc oxide, dolomite, calcite, kaolin, quartz, silica, barium carbonate, wollastonite, tin oxide, nepheline, bismuth oxide, colemanite, calcium carbonate, cerium oxide, cobalt oxide, copper oxide, iron oxide, aluminium phosphate, iron carbonate, manganese oxide, sodium fluoride, chromium oxide, strontium carbonate, lithium carbonate, spodumene, talc, magnesium oxide, cristobalite, rutile, anatase, or mixture thereof.

In a most particular aspect of the invention, the anti-settling material of the GLAZE ink of the present invention is selected from carbon black, clay, kaolin, aluminium silicate, carboxymethyl cellulose, bentonite, colloidal magnesium oxide and hydroxide, calcium, strontium, barium, tungsten, zinc, aluminum, silicon, tin and antimony.

In a most particular aspect, the GLAZE ink of the present invention comprises a ceramic pigment selected from natural and/or synthetic coloring oxides.

In a most particular aspect of the present invention, the non-aqueous polar solvents of the GLAZE ink of the present invention are selected from alcohols, aliphatic fatty alcohols, glycols, polyglycols, glycols esters, glycol ethers, phenols, alkylphenols, fatty acids, terpenes, terpenic alcohols, terpenic oils, and copolymers of vinyl pyrrolidone, preferably, the non-aqueous polar solvents de(eliminar) the GLAZE ink of the present invention are glycols and glycerin.

In a most particular aspect of the present invention, the additives of the GLAZE ink of the present invention are selected from dispersants, rheological modifiers, surfactants, anti-foaming, buffer for pH control, bactericides, fungicides, preservatives.

In a most particular aspect, the GLAZE ink of the present invention has a viscosity ranging between 5-70 cP at the working temperature.

In a most particular aspect, the GLAZE ink of the present invention has a pH ranging between 5-12.

Digital GLAZE ink according to any of preceding claims characterized in that it has a surface tension at room temperature greater than 30 mN/m.

In a second aspect, the present invention relates to a method for making the digital GLAZE ink of the present invention comprising the following steps:
  a) mixing the solid raw materials,
  b) putting in the mill the solids in the step a) together with part of the water, solvents and additives,
  c) grinding,
  d) controlling the particle size to ensure that the suitable particle size distribution is obtained,
  e) adding the rest of the water, solvents and liquid additives,
  f) discharging the mill by sieving and filtering,
  g) controlling and adjusting the viscosity, In a most particular aspect, the step c) is carried out for a time ranging between 5-15 hours.

In a most particular aspect, the step d) is carried out by laser beam diffraction en wet process.

In a most particular aspect, the sieving of the step f) is carried out at 80 µm and the filtering at 40 µm.

In a most particular aspect, el adjustment of the viscosity is carried out by water and/or additives.

In a most particular aspect, the grinding of the step c) is in ball mill.

In a third aspect, the present invention relates to the use of the GLAZE ink of the present invention for functional and/or decorative coating of a ceramic and/or metallic material. In a most particular aspect of the present invention, the coating of the ceramic and/or metallic material is carried out by a digital ink system.

DETAILED DESCRIPTION OF THE INVENTION

The high discharge digital GLAZE of the present invention applicable to industrial decoration, are characterized in that the composition contains a solid portion formed by inorganic and organic materials and a liquid aqueous and/or polar portion which are homogenized, and once it is applied on the ceramic support, it is cooked at temperatures between 500° C. and 1300° C.

Ceramic appearance that the inks of the present invention provide ceramic products not only is limited to the fact of coloring the surface ceramic or GLAZE on which are applied, but they give a finish (gloss, matt, roughness, lustre, metallized, embossing, etc) that inks for injection until now do not provide.

With regard to the formulation of high discharge digital GLAZE, the main difference with the current ceramic inks for injection is the use of water in its formulation. Even though the liquid portion will also have another type of polar solvent and/or additives, the water will become part of digital GLAZES, and therefore more respectful with the environment, in percentages greater than 5% of the total weight of the ink.

Non-aqueous polar component of the ink is a mixture of one or more compounds selected from aliphatic fatty alcohols, glycols, polyglycols, glycols esters, glycol ethers, phenols, alkylphenols, fatty acids, terpenes, terpenic alcohols, terpenic oils, and copolymers of vinyl pyrrolidone. Non-aqueous polar component will be part of the ink in percentages greater than 5% of the total weight.

For the formulation of the solid portion, raw materials will be used, which have been used at present for the formulation of ceramic GLAZES that are applied with traditional techniques such as: frits, sands, feldspars, aluminas, clays, zirconium silicate, zinc oxide, dolomite, calcite, clay, kaolin, etc); along with materials that act as anti-settlings: carbon black, clay, kaolin, aluminium silicate, carboxymethyl cellulose, bentonite, colloidal magnesium oxide and hydroxide, calcium, strontium, barium, tungsten, zinc, aluminum, silicon, tin and antimony. The solid portion of the digital GLAZES represents between 10% and 70% by weight, preferably between 20% and 50% by weight depending on the ceramic and material effect required. It is logical that when more layer thickness is necessary, the solid content and the weight applied will be higher.

When the ink is colored, ceramic pigments will be used, mixture of one or more components selected from conventional natural or synthetic coloring oxides.

The particle size of high discharge digital GLAZES of the present invention is greater than that of the current colored ceramic inks for injection, which is sub-micron, but much thinner than the traditional applications, which have a $d_{100}$ of 45 μm or higher. Therefore, a step of grinding, in wet or dry process, but preferably in wet process, is required for the preparation of high discharge digital GLAZE. Thicker size within a particle size distribution ($d_{100}$, 100% of particles below that value) is from 3 to 40 μm and the size below which is 90% in volume of the particles is from 1 to 11 μm, in addition the particle size distribution must be as narrow as possible. Regarding inkjet inks and GLAZES for DOD heads, a thicker size will allow saving energy and money at the step of grinding of the dispersion of solids and therefore favor the expansion of the technique.

Additives such as dispersants, surfactants, anti-foamings, rheology modifiers, buffer for pH control, bactericides, fungicides, etc. . . . usually used in the preparation of any ink or GLAZE, can be used.

In addition, both the manufacturing process and the chemical composition of high discharge digital GLAZES are economically comparable to conventional inks and totally viable for digital implementation on an industrial scale, in addition they can have a better respect for the environment. However, the main feature of high discharge digital GLAZES is in their physical properties, such as viscosity higher than 5 cP at application temperature and surface tension higher than 30 mN/m, as described below.

The optimum and characteristic physical properties of high discharge digital GLAZES are:
  Ceramic particle size distribution (% in volume): $0{,}5\ \mu m \leq d_{50} \leq 4{,}5\ \mu m$, $1\ \mu m \leq d_{90} \leq 11\ \mu m$ and $3\ \mu m \leq d_{100} \leq 40\ \mu m$
  Viscosity at application temperature (20-40° C.): from 5 to 70 cP
  Rheological behavior: slightly pseudoplastic.
  Surface tension at room temperature 30 mN/m
  Density at 20° C. $\leq 1$ g/ml
  Solid content: between 10 and 70% by weight, preferably between 20 and 50% by weight
  pH: between 5 and 12
  Without hard sedimentation and easily redispersable
  Completely water-miscible
  Fully compatible with the materials of the digital printing system.

These high discharge digital GLAZES can be used in digital print heads, described in the patent EP2085225A2, and designed for decorating ceramic products. They can also be used in any type of head, as those described in WO99/46126 and WO2006/027212, or that supports the use of polar and/or aqueous inks with the abovementioned physical properties. On the other hand, they also are specially formulated to be applied on porous supports that can absorb the liquid portion of the inks and such that they develop the desired ceramic effect when are cooked between 500 and 1300° C. However, they can also adapt to be applied on non-porous supports, like glass and metal, incorporating an organic fixer or a volatile solvent(s) below 100° C. so that the digital GLAZE dries quickly before the heat treatment (500 to 800° C.).

These properties cannot be obtained by simple mixing of conventional ceramic products or simple dilution of a conventional ceramic serigraph ink due to the solid content have to be considerably reduced and therefore the effect of thickened would be lost and the suspension would also be unstable during the application due to the coarse of particle size. On the other hand, the optimum physical properties of digital GLAZES would not suitable for a conventional application due to the low viscosity and low pseudo-plasticity.

As with the ceramic pigmented inkjet inks, the digital GLAZE inks are ready to use, because of the numerous advantages for the end user, but in polar base fully compatible with water for easy cleaning of the digital delivery system.

Digital GLAZES can be colored or not with ceramic pigments based on application requirements.

High discharge digital GLAZES of the present invention not only have optimal performance in the printing system but they can also be deposited with weights from between 10 $g/m^2$ and 3 $kg/m^2$ and therefore allow obtaining thick layers with the perfect development of the necessary ceramic appearance after cooking cycles at high temperatures between 500 and 1300° C.

EXAMPLE 1

Digital GLAZE Ink

Table 1 shows various examples of digital GLAZE ink of the present invention

TABLE 1

| RAW | digital GLAZE ink | | | | | | | |
|---|---|---|---|---|---|---|---|---|
| | GLAZES (%) | | | | | | | |
| MATERIALS | 1 | 2 | 3 | 4 | 5 | 6 | 7 | 8 |
| Frit | 6 | 10 | 8 | 10 | 10 | 10 | 6 | 6 |
| Kaolin | 2 | 3 | 6 | 2.8 | 3 | 2.8 | 4 | 4 |
| Sodium feldspar | 8 | 14.2 | 10.6 | | | | 8.4 | 8.4 |

TABLE 1-continued digital GLAZE ink

| RAW MATERIALS | GLAZES (%) | | | | | | | |
|---|---|---|---|---|---|---|---|---|
| | 1 | 2 | 3 | 4 | 5 | 6 | 7 | 8 |
| Quartz | 18.4 | 8.6 | 12.2 | 8 | | 8 | 9.2 | 9.2 |
| Zr silicate micronized of 5 μm | 2.0 | | | | 12 | | | |
| Alumina | 3.6 | 4.2 | 3.2 | | | | 3.2 | 3.2 |
| Wollastonite | | | | 8 | | 8 | 9.2 | 9.2 |
| Potassium feldspar | | | | 7.6 | | 7.6 | | |
| Dolomite | | | | 3.6 | | 3.6 | | |
| Tin oxide | | | | | 15 | | | |
| WATER | 32.3 | 38.3 | 20.7 | 32.58 | 20.45 | 5 | 32.46 | 52.38 |
| Monoethylene glycol | 25.4 | | 37.0 | 25.0 | 37.0 | 52.5 | | |
| Diethylene glycol | | | | | | | 25 | |
| Glycerin | | 19 | | | | | | 5 |
| Anti-foaming | 2 | 2 | 2 | 2 | 2 | 2 | 2 | 2 |
| Dispersant | 0.2 | 0.6 | 0.2 | 0.3 | 0.4 | 0.4 | 0.4 | 0.4 |
| Carboxymethyl cellulose | 0.08 | 0.08 | 0.08 | 0.1 | 0.13 | 0.08 | 0.12 | 0.2 |
| Bactericide | 0.02 | 0.02 | 0.02 | 0.02 | 0.02 | 0.02 | 0.02 | 0.02 |

Table 2 shows the physical properties of inks of the present invention

TABLE 2

Physical properties of inks of the present invention

| Physical properties | GLAZE 1 | GLAZE 2 | GLAZE 3 | GLAZE 4 | GLAZE 5 | GLAZE 6 | GLAZE 7 | GLAZE 8 |
|---|---|---|---|---|---|---|---|---|
| CS (%) | 40 | 40 | 40 | 40 | 40 | 40 | 40 | 40 |
| D50 (μm) | 2.7 | 2.5 | 2.6 | 2.6 | 1.1 | 2.5 | 2.6 | 2.8 |
| D90 (μm) | 8.1 | 7.5 | 7.8 | 7.6 | 4.2 | 7.6 | 8.0 | 8.5 |
| D100 (μm) | 20.6 | 20.6 | 20.6 | 20.6 | 17.4 | 20.6 | 20.6 | 24.6 |
| Density (20° C.) (g/cm$^3$) | 1.44 | 1.43 | 1.43 | 1.42 | 1.56 | 1.45 | 1.42 | 1.38 |
| Vis (20° C.) (cP) | 31.0 | 34.0 | | 27.0 | | | 42.3 | 26.0 |
| Vis (35° C.) (cP) | | | 35.0 | | 34.6 | 66 | | |
| Surface tension (mN/m) (25° C.) | 38 | 40 | 36 | 38 | 36 | 38 | 36 | 38 |

EXAMPLE 2

Method for Making the Digital GLAZE Ink of the Present Invention

The general procedure for making the digital GLAZE ink of the present invention comprised the following steps:

Mixing the solid raw materials.

Putting in the mill the solids with all or part of the water and all or part of the rest of the liquid components of the digital GLAZE (solvents and liquid additives).

Grinding in ball mill for a time ranging between 5-15 h, with a ball charge the size distribution of which is specific to obtain the desired particle size.

Controlling the particle size by measuring it by means of a equipment of laser beam diffraction in wet process, to verify that the suitable particle size distribution is obtained.

Adding the rest of water and liquid components (solvents and liquid additives) not introduced in the initial grinding.

Discharging the mill with a material sieving at 80 μm and subsequent filtering at 40 μm to eliminate the possible existence of coarse particles that could produce stoppage and damage the head with which will be GLAZE.

Controlling the viscosity to verify that it has the optimum working value, which will be determined by the head that is to be used. Adjustment of this property if necessary by the use of water or additives.

In the specific case of the GLAZE ink 1, the process was as follows:

Mixing of the frit, kaolin, sodium feldspar, quartz, zirconium silicate, Alumina, dispersant, carboxymethyl cellulose.

Putting in the mill the solids and water (about 75% of total water of the formula).

Grinding until achieving a d90≈8 μm measured by laser in wet process

Adding the monoethylene glycol, anti-foaming, bactericide and remaining water.

Discharging the mill with a material sieving at 80 μm and subsequent filtering at 40 μm.

Ensuring that the desired viscosity has been obtained, and adjusting this property if necessary by the use of additives or water.

The invention claimed is:

1. Digital GLAZE ink comprising a solid portion made up of organic and/or inorganic materials, dispersed in a polar and/or aqueous liquid portion wherein:
   the solid portion is between 10-70% of the total weight of the ink, the solid particle size is less than 40 μm and comprises:
      at least a flux material, a ceramic raw material or frit
      at least an anti-settling material
   the liquid portion comprises:
      water in a percentage of at least 5% of the total weight of the ink,
      at least 5% of the total weight of one or more non-aqueous polar solvents
      additives
   wherein a solid particle size distribution in percent volume is such that $0.5\,\mu m \leq d_{50} \leq 4.5\,\mu m$, $1\,\mu m \leq d_{90} \leq 11\,\mu m$, and $3\,\mu m \leq d_{100} \leq 40\,\mu m$.

2. Digital GLAZE ink according to claim 1, where the flux material, ceramic raw material or frit is at least one element selected from frits, sands, feldspars, aluminas, clays, zirconium silicate, zinc oxide, dolomite, calcite, kaolin, quartz, silica, barium carbonate, wollastonite, tin oxide, nepheline, bismuth oxide, colemanite, calcium carbonate, cerium oxide, cobalt oxide, copper oxide, iron oxide, aluminium phosphate, iron carbonate, manganese oxide, sodium fluoride, chromium oxide, strontium carbonate, lithium carbonate, spodumene, talc, magnesium oxide, cristobalite, rutile, anatase, or mixture thereof.

3. Digital GLAZE ink according to claim 1, where the anti-settling material is selected from carbon black, clay, kaolin, aluminium silicate, carboxymethyl cellulose, bentonite, colloidal magnesium oxide and hydroxide, calcium, strontium, barium, tungsten, zinc, aluminum, silicon, tin and antimony.

4. Digital GLAZE ink according to claim 1, wherein the ink comprises a ceramic pigment selected from natural and/or synthetic coloring oxides.

5. Digital GLAZE ink according to claim 1, where the non-aqueous polar solvents are selected from alcohols, aliphatic fatty alcohols, glycols, polyglycols, glycols esters, glycol ethers, phenols, alkylphenols, fatty acids, terpenes, terpenic alcohols, terpenic oils, and copolymers of vinyl pyrrolidone.

6. Digital GLAZE ink according to claim 1, where the additives are selected from dispersants, rheological modifiers, surfactants, anti-foaming, buffer for pH control, bactericides, fungicides, preservatives.

7. Digital GLAZE ink according to claim 1 wherein the ink has a viscosity ranging between 5-70 cP at the working temperature.

8. Digital GLAZE ink according to claim 1 wherein the ink has a pH ranging between 5-12.

9. Digital GLAZE ink according to claim 1 wherein the ink has a surface tension at room temperature greater than 30 mN/m.

10. Method for the preparation of the digital GLAZE ink according to claim 1 comprising the following steps:
   a) mixing of the solid raw materials,
   b) putting in a mill the solids in the step a) together with part of the water, solvents and additives,
   c) grinding,
   d) controlling the particle size to ensure that the solid particle size distribution of 0.5 $\mu m \leq d_{50} \leq 4.5$ $\mu m$, 1 $\mu m \leq d_{90} \leq 11$ $\mu m$, and 3 $\mu m \leq d_{100} \leq 40$ $\mu m$ in percent volume is obtained,
   e) adding the rest of the water, solvents and liquid additives,
   f) discharging the mill by sieving and filtering,
   g) controlling and adjusting a viscosity.

11. Method according to claim 10, wherein the step c) is carried out for a time ranging between 5-15 hours.

12. Method according to claim 10, wherein the step d) is carried out by laser beam diffraction in wet process.

13. Method according to claim 10, wherein the sieving of the step f) is carried out with a sieve having a pore size of 80 $\mu m$ and subsequently, the filtering is carried out with a filter having a pore size of 40 $\mu m$.

14. Method according to claim 10, wherein the adjustment of the viscosity is carried out by water and/or additives.

15. A method for functionally and/or decoratively coating a material comprising applying the GLAZE ink according to claim 1 to a ceramic and/or metallic material.

16. The method according to claim 15, wherein the GLAZE ink is applied to the ceramic and/or metallic material by a digital ink system.

* * * * *